US006609548B2

(12) United States Patent
Kousaie et al.

(10) Patent No.: US 6,609,548 B2
(45) Date of Patent: Aug. 26, 2003

(54) ASYMMETRICAL VEHICLE TIRE WITH BALANCED WET AND DRY PERFORMANCE

(75) Inventors: Michael Kousaie, Greer, SC (US); John Anthony Hutz, Greer, SC (US)

(73) Assignee: Michelin Recherche et Technique S.A. (CH)

(*) Notice: Subject to any disclaimer, the term of this patent is extended or adjusted under 35 U.S.C. 154(b) by 234 days.

(21) Appl. No.: 09/796,011

(22) Filed: Feb. 28, 2001

(65) Prior Publication Data

US 2003/0047262 A1 Mar. 13, 2003

Related U.S. Application Data

(63) Continuation-in-part of application No. 29/123,118, filed on May 11, 2000, now Pat. No. Des. 444,428.

(51) Int. Cl.$^7$ .................. B60C 11/13; B60C 111/00
(52) U.S. Cl. .................. 152/209.8; 152/209.24
(58) Field of Search .................. 152/209.8, 209.9, 152/209.21, 209.24

(56) References Cited

U.S. PATENT DOCUMENTS

| | | | |
|---|---|---|---|
| 2,843,172 A | | 7/1958 | Berry et al. .................. 152/209 |
| 3,162,229 A | * | 12/1964 | Ellenrieder et al. |
| 3,405,753 A | * | 10/1968 | Verdier |
| 4,546,808 A | | 10/1985 | Fontaine et al. .................. 152/209 R |
| D326,075 S | | 5/1992 | Covert et al. .................. D12/147 |
| 5,407,005 A | | 4/1995 | Consolacion et al. ... 152/209 A |
| 5,415,215 A | * | 5/1995 | Covert et al. |
| D359,017 S | | 6/1995 | McKisson .................. D12/146 |
| 5,421,387 A | | 6/1995 | Emerson .................. 152/209 A |
| D372,891 S | | 8/1996 | McKisson .................. D12/146 |
| 5,567,253 A | * | 10/1996 | Iwamura |
| 5,660,651 A | | 8/1997 | Diensthuber .................. 152/209 A |
| 5,964,267 A | * | 10/1999 | Poque et al. |

FOREIGN PATENT DOCUMENTS

| | | | |
|---|---|---|---|
| EP | 402595 | * | 12/1990 |
| JP | 59-124412 | * | 7/1984 |
| JP | 61-16110 | * | 1/1986 |
| WO | WO 97/46359 | * | 12/1997 |

OTHER PUBLICATIONS

Tread Design Guide, 1999, p. 35, BFGoodrich Lifesaver A/W.
Tread Design Guide, 1999, p. 55, NTB GoodYear Weatherhandler.

* cited by examiner

Primary Examiner—Steven D. Maki
(74) Attorney, Agent, or Firm—Martin Farrell; Robert R. Reed; Alan A. Csontos

(57) ABSTRACT

The tire of this invention has an asymmetrical tread pattern with a balanced inboard and outboard tread pattern. The tread pattern has a plurality of tread ribs with their average transverse widths equal to one another at the contact with the road surface. The total contact surface area on the inboard side of the mid-circumferential plane is essentially equal to the total contact surface area on the outboard side. The circumferential grooves between tread ribs have a groove base which is straight in the circumferential direction. The groove openings between the contact surface areas of adjacent ribs have a serpentine shape, except for the outermost outboard groove. The amplitude of the serpentine grooves increases from the outboard straight groove to the innermost inboard groove. The ribs have a rib base with a transverse width greater than the transverse width of each rib at the contact surface. This difference in width varies in the circumferential direction, and a greater difference exists on the inboard side of the tread pattern.

24 Claims, 8 Drawing Sheets

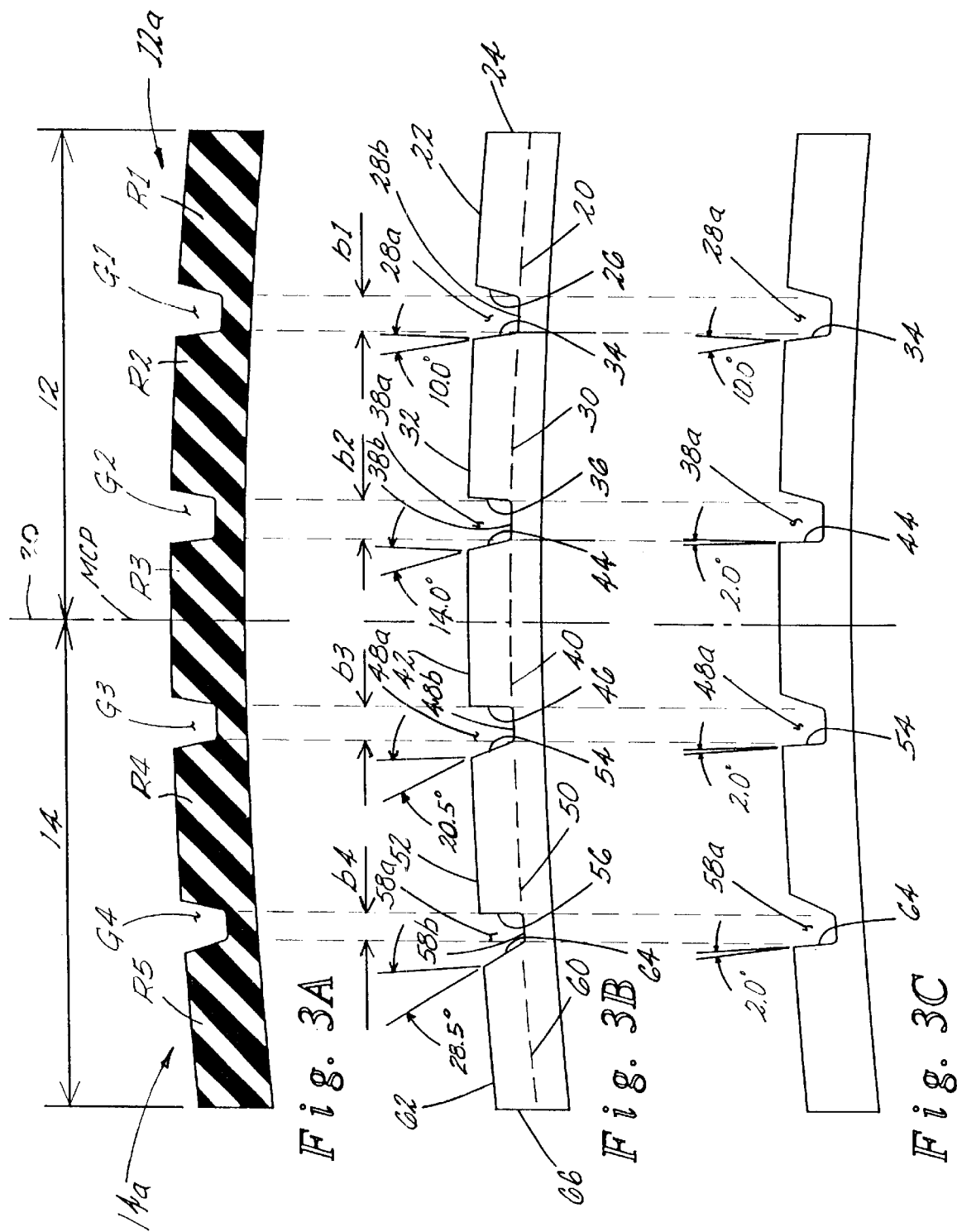

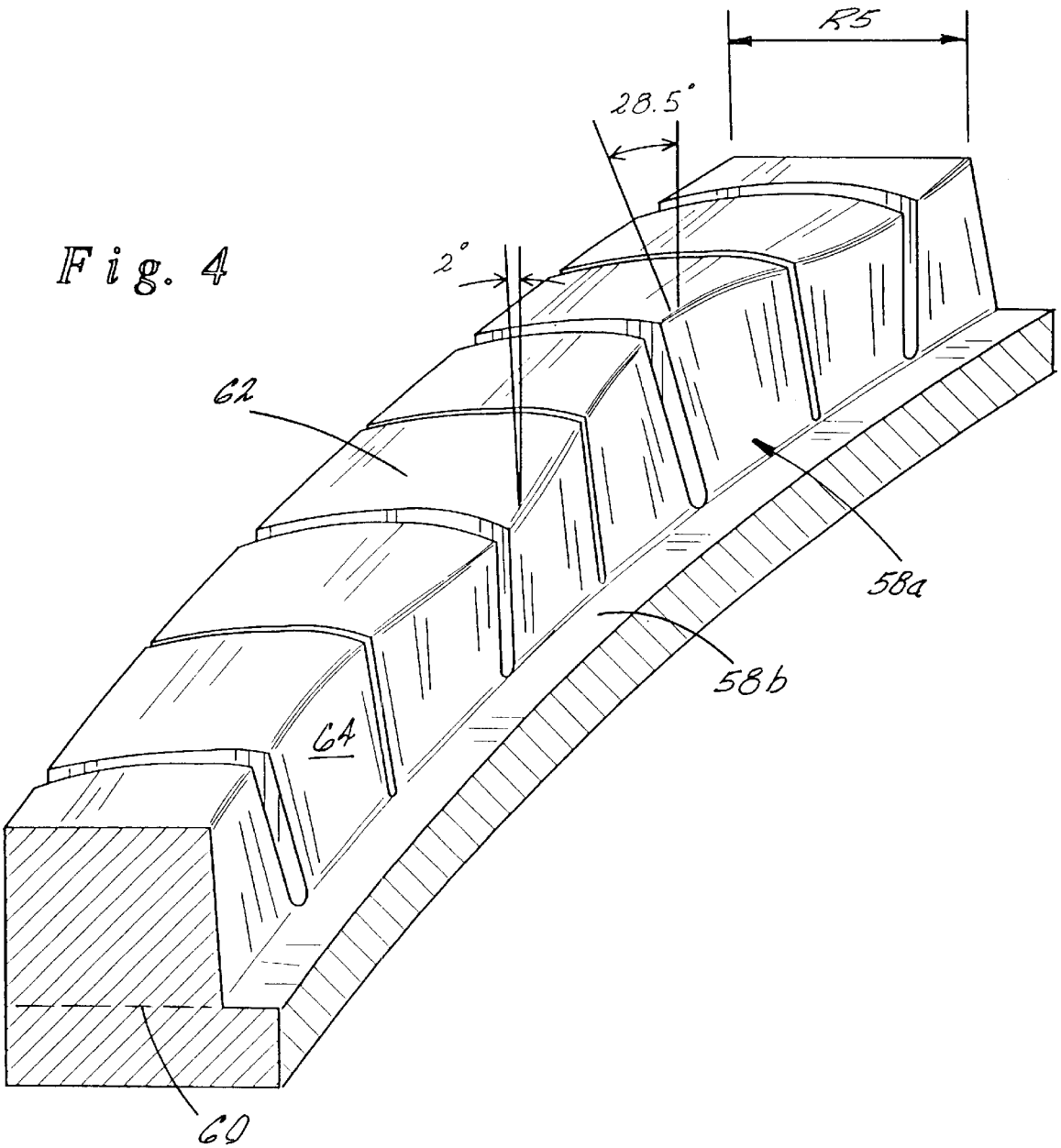

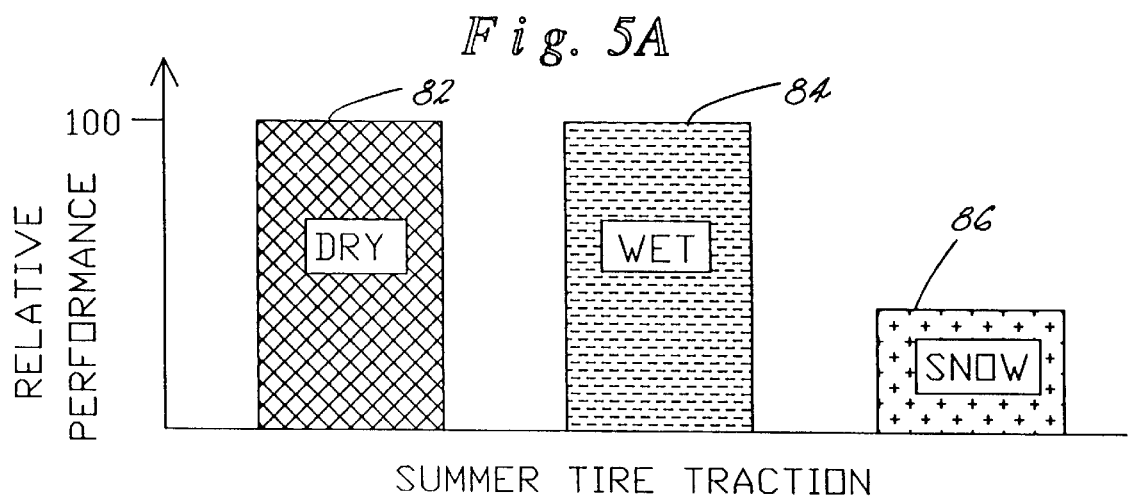
Fig. 5A — SUMMER TIRE TRACTION
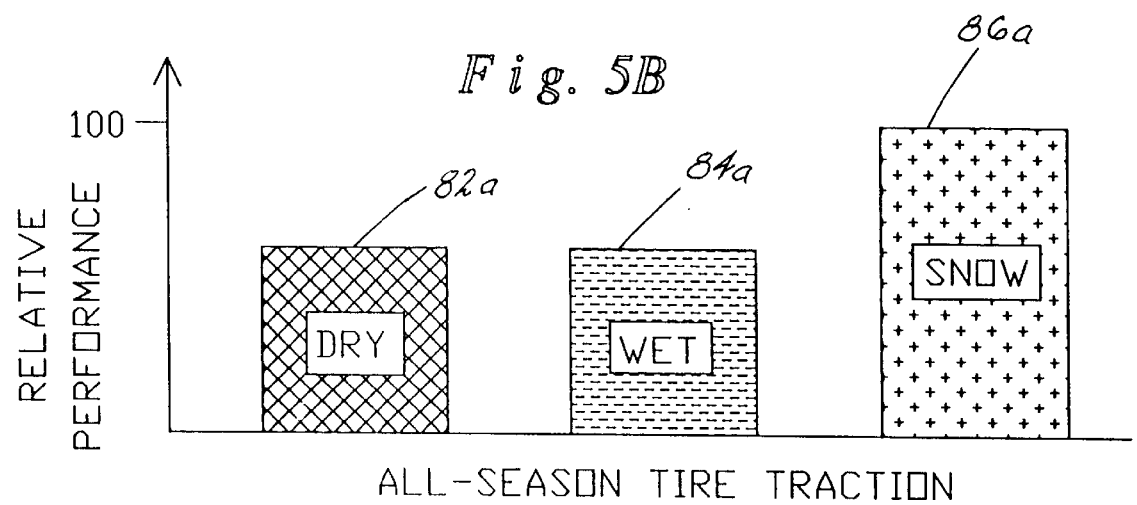
Fig. 5B — ALL-SEASON TIRE TRACTION
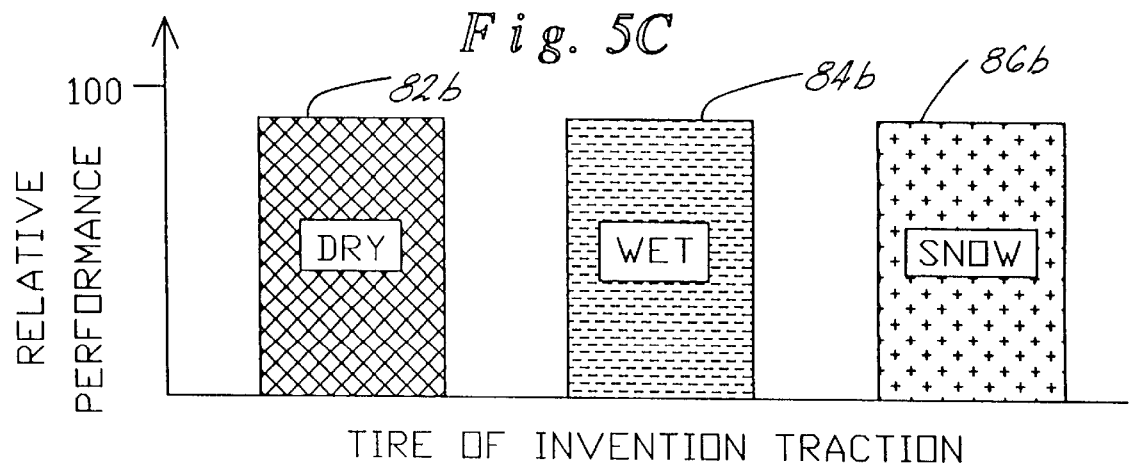
Fig. 5C — TIRE OF INVENTION TRACTION

ASYMMETRICAL VEHICLE TIRE WITH BALANCED WET AND DRY PERFORMANCE

This application is a continuation-in-part of application Ser. No. 29/123,118 filed May 11, 2000 now U.S. Des. Pat. No. 444,428.

BACKGROUND OF THE INVENTION

This invention relates to a high performance vehicle tire having an asymmetrical tread pattern defined by an inboard tread pattern and an outboard tread pattern which provide more balanced wet, dry and snow handling and traction.

With the increase in high performance vehicles the need for high performance tires which give the consumer a feel of maximum control, grip, and handling capability has also increased. In particular, different vehicle tires are known for their handling and traction performance under one or more of the following: dry road conditions; wet road conditions; and bad weather conditions, such as on snow and ice. Certain vehicle tires are designed to maximize their performance under wet conditions, and others are designed to improve their performance in bad weather conditions, not normally encountered in a summer season design. Considerable attention has been given to the problem of designing a tire tread pattern which provides a high level of handling and traction in dry, wet, and snow conditions. These tires are commonly referred to as "all season" tires.

Initially, when the idea of "all season" tires came about, the tires were symmetrical in their tread pattern. That is, the tire tread looked the same on both sides of the mid-circumferential plane. Both sides of the circumferential plane included more design elements, smaller tread blocks, and more lateral groove events. The tires gained snow traction and picked up some minimum wet traction, but gave up a large amount of dry traction. This led to the next advancement where asymmetry was designed into the tire. The tread patterns on either side of the circumferential plane were different. The purpose of the asymmetrical tire was an attempt to increase the overall dry performance primarily on one side of the tire tread and adding some wet performance improvements of the other side while maintaining good snow performance.

One feature of "all seasons" tires is the use of lateral design elements in the tire. These consist of major grooves or small inlet cuts which are called sipes. The more of the lateral design elements, the better grip is provided in snow, slush, deep water, and possibly even ice, depending on the temperature at the surface. In an asymmetrical tread pattern tire, the tire is divided into an inboard tread pattern and an outboard tread pattern about the mid-circumferential plane of the tire. The outboard tread pattern typically includes larger tread block, larger design elements, and fewer lateral grooves and sipes to provide dry handling and traction. The inboard tread pattern typically includes smaller tread blocks, smaller design elements and more lateral grooves and sipes to provide better wet and snow handling and traction. However, the typical all-season tire does not have as good a dry road performance as a conventional asymmetric tire, nor as good a wet road performance as a summer tire, but has better snow performance. However, the tire provides somewhat better performance over all seasons for someone who does not want to remove their summer tires and install snow tires during the winter.

In the typical asymmetrical design, the outboard pattern provides dry performance, and the inboard pattern provides wet performance, with the lateral design elements providing snow performance. The inboard pattern is typically designed with more void space and less road contact surface to aid in the bleeding of water away from the tread and improve wet handling performance. This also provides more tread element edges to contact snow. The outboard pattern has larger blocks and fewer lateral elements to provide block rigidity for increased road surface contact but has less void space, which compromises water removal. Thus, the provision of an all season, high performance vehicle tire in which the wet and dry performance is more balanced and not sacrificed to the provision of snow performance is a problem to which much consideration still must be given.

U.S. Pat. No. 5,660,651 discloses an asymmetrical tire design for use in winter driving conditions wherein the inner and outer shoulder treads are asymmetrical. The inner shoulder tread includes sipes having good opening characteristics and the outer shoulder tread is provided with sipes that assure high tread block rigidity.

U.S. Pat. No. 5,421,387 discloses an asymmetrical tire tread wherein the tread rubber volume is equal on the two sides of the mid-circumferential plane of the tread, and the tread grooves decrease in their width toward the inboard side to improve tread wear, snow traction, tire noise, lateral traction, and overall vehicle handling.

U.S. Pat. No. 5,407,005 discloses an asymmetric, nondirectional tire tread in which the net contact area in a first tread half is approximately equivalent to a net contact area in a second tread half, wherein the tread stiffness in the first tread half is preferably higher than the second tread half.

While the prior asymmetrical tread patterns for high performance tires have utilized various combinations of tread elements and design, the prior high performance tires have not satisfactorily found the right combination to provide balanced handling and traction in wet, dry, and snow conditions.

Accordingly, an object of the present invention is to provide an asymmetrical high performance vehicle tire with balanced wet, dry, and snow handling and traction without sacrificing any one seasonal handling capability.

Another object of the present invention is to provide an asymmetrical high performance vehicle tire wherein the water removal capability of the outboard side is improved and the tread block stability of the inboard side is improved without significantly sacrificing the dry and wet performance of the outboard and inboard sides or snow performance.

Another object of the present invention is to provide an asymmetrical high performance vehicle tire wherein the inboard wet tread pattern has increased tread stability for dry performance without sacrificing water removal capacity and wet performance, and the outboard dry pattern has increased water removal capacity without sacrificing tread stability and dry performance.

SUMMARY OF THE INVENTION

The above objectives are accomplished according to the present invention by providing a high performance, asymmetric vehicle tire having an asymmetrical tire tread pattern with an inboard tread pattern and an outboard tread pattern defined with respect to a mid-circumferential plane of the tire carcass that provides a more balanced wet, dry, and snow performance. The inboard tread pattern includes a plurality of circumferential inboard tread ribs encircling the carcass with circumferential inboard tread grooves defined between the inboard tread ribs. The outboard tread pattern includes a plurality of circumferential outboard tread ribs encircling the carcass with circumferential outboard tread grooves defined between the outboard tread ribs. The inboard tread ribs and the outboard tread ribs have a rib contact surface and a bottom rib base. The contact surface is the most radially outer portion of the tread that contacts the road surface. An inboard contact surface area is defined by the area of the contact surface of the inboard tread ribs, and an outboard contact surface area is defined by the area of the contact surface of the outboard tread ribs wherein the inboard and outboard contact surface areas are substantially equal. A plurality of lateral grooves are formed in the inboard and outboard tread patterns, and the inboard tread pattern has a higher density of lateral grooves than the outboard tread pattern. Advantageously, the inboard and outboard tread ribs have an average rib width which is generally equal from rib to rib across the asymmetric tread pattern. The average rib width is the circumferential average from rib wall to rib wall at the contact surface. In one aspect of the invention, the inboard and outboard tread grooves include a groove opening having a width between adjacent rib contact surfaces wherein the groove width is generally equal for all the tread grooves. The inboard and outboard grooves include a generally straight groove base extending in the circumferential direction. The groove opening of the inboard tread grooves between rib contact surfaces is generally a serpentine shape.

Advantageously, the width of the groove base of the tread groove increases from the inboard to the outboard side to facilitate water removal and enhance wet handling of the outboard side. The inboard tread grooves have a serpentine shape at the groove opening, wherein the tread grooves generally become progressively more sinusoidal in amplitude across the tread portion from the outboard side to the inboard side. Also advantageously, the groove base of the tread grooves decreases in base width from the outboard side to the inboard side. In a preferred embodiment, the asymmetric tread pattern includes a first outboard groove having a generally straight groove base and groove opening, and the remaining ones of the tread grooves at the groove opening having an increasingly sinusoidal amplitude across the tread pattern towards the inboard side. The groove openings have a width which is generally equal for each of the groove openings across the tread pattern. The sinusoidal tread grooves are created by rib walls of adjacent tread ribs which taper outwardly and upwardly radially from the groove bases to the rib contact surfaces so that the rib bases have an area greater than the rib contact surfaces providing increased inboard tread rib strength and stability to enhance dry handling performance of the inboard tread portion. The taper of the rib walls increases from the outboard side toward the inboard side of the tire. The tapering rib walls have a taper angle which varies and shifts laterally from side-to-side in the circumferential direction of each tread groove. The taper angle of the outboard tread grooves is less than the inboard grooves to increase water removal from the outboard tread pattern to improve wet performance.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3A is a sectional view taken along line 3a—3a of FIG. 2;

FIG. 3B is a sectional view taken along line 3b—3b of FIG. 2;

FIG. 3C is a sectional view taken along line 3c—3c of FIG. 2;

FIG. 4 is a perspective view illustrating an inboard tread rib having trapezoidal shaped rib blocks with varying tapered rib walls;

FIG. 5A is a chart illustrating the relative traction performance of a summer tire;

FIG. 5B is a graph illustrating the relative traction performance of a conventional all season tire;

FIG. 5C is a graph illustrating the relative traction performance of a high performance tire according to the invention;

Description of a Preferred Embodiment

Referring now in more detail to the drawings, the invention will now be described in more detail.

Figure 1:
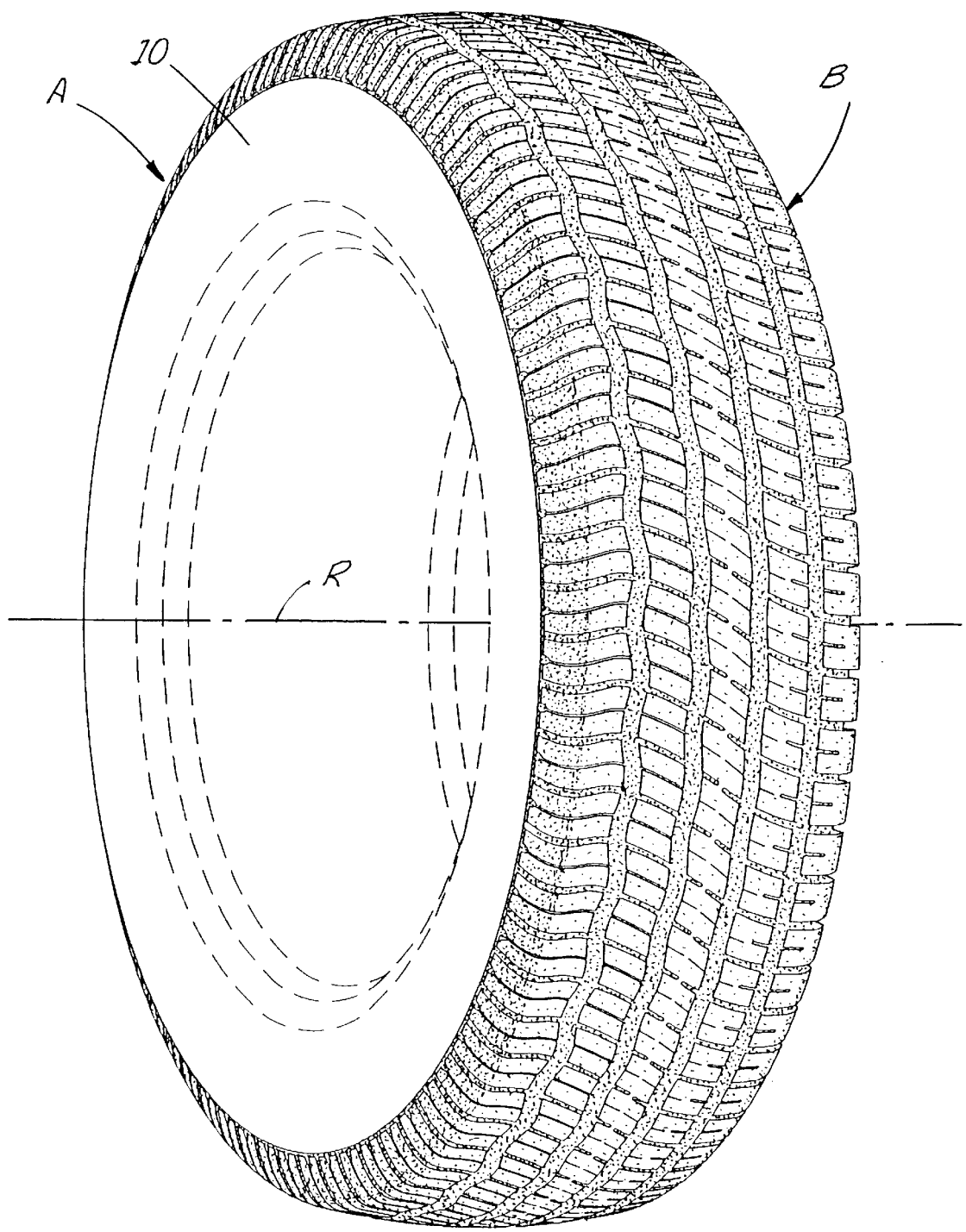
FIG. 1 is a perspective view of an asymmetrical high performance tire according to the invention.

FIG. 1 is a perspective view of a high performance asymmetrical vehicle tire in accordance with the invention, designated generally as A, having generally balanced wet and dry handling and traction, as well as good snow performance. Tire A includes a tire carcass 10 on which is formed an asymmetrical tread pattern, designated generally as B. Vehicle tires rotate in one direction about a rotational axis R on one side of the vehicle and in an opposite direction on the other side of the vehicle. The tire of this invention provides a non-directional tread pattern which provides the advantages of the invention when mounted on either side of a vehicle.

Figure 2:
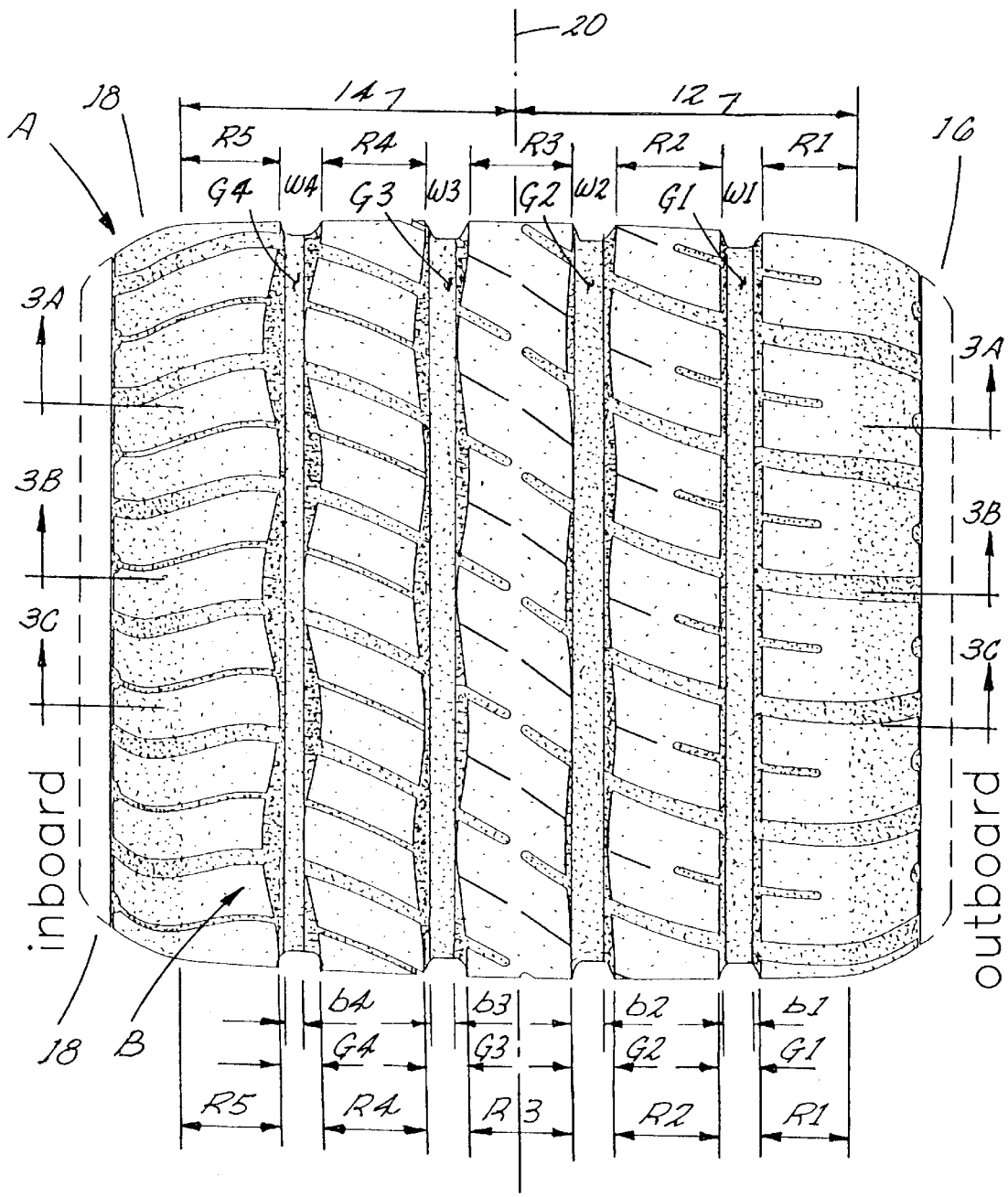
FIG. 2 is a plan view of an asymmetric high performance vehicle tire according to the invention illustrating the inboard tread pattern and outboard tread pattern as defined about a mid-circumferential plane.

As best can be seen in FIG. 2, the asymmetrical tread pattern includes an outboard tread pattern, designated generally as 12, and an inboard tread pattern, designated generally as 14. The asymmetrical tread pattern includes a plurality tread ribs "R" and a plurality of tread grooves "G." There are shoulder ribs R1 and R5 on the outboard and inboard sides, 12 and 14, respectively, and a plurality of center ribs R2, R3, and R4. Between the tread ribs, a plurality of tread grooves, G1, G2, G3, and G4 are created in tread pattern B. It will be noted that outboard tread pattern 12 includes tread ribs R1, R2 and tread grooves G1 and G2, as well as half of tread rib R3. Similarly, inboard tread pattern 14 includes tread ribs R4, R5 and tread grooves G3, G4, as well as half of tread rib R3. Outboard and inboard tread patterns 12 and 14 are defined about a mid-circumferential plane 20.

As best can be seen in FIGS. 3B, tread rib R1 includes a rib base 20, a rib contact surface 22 and pair of opposing rib walls 24 and 26. Tread rib R2 includes a rib base 30, a road contact surface 32, and a pair of opposing rib walls 34 and 36. Rib R3 includes a rib base 40, a rib contact surface 42, and a pair of side rib walls 44 and 46. Tread rib R4 includes a rib base 50, a rib contact surface 52, and side rib walls 54, 56. The tread rib R5 includes a rib base 60, a road contact surface 62, and side rib walls 64, 66. FIG. 4 illustrates a perspective view of tread rib R5. The rib contact surfaces 22, 32, 42, 52 and 62 are the rib surfaces of asymmetrical tread pattern B which contact the road surface each revolution of the tire during normal running of the tire.

Tread grooves G are defined between the rib walls of adjacent tread ribs. Tread grooves G includes a groove base defined between rib bases of adjacent ribs and extend radially to include groove openings defined between the rib contact surfaces of adjacent tread ribs. For example, groove G1 includes a groove opening 28a defined between contact surfaces 22, 32, and a groove base 28b defined between rib bases 20, 30. Groove G2 includes a groove opening 38a defined between contact surfaces 32, 42, and a groove base 38b defined between rib bases 30, 40. Tread groove G3 includes a groove opening 48a defined between contact surfaces 42, 52 and a groove base 48b defined between rib bases 40, 50. Tread groove G4 includes a groove opening 58a defined between contact surfaces 52, 62, and a groove base 58b which is defined between rib bases 50 and 60.

Advantageously, according to the present invention, the width "w" of groove openings 28a, 38a, 48a and 58a are generally equal in width, while the width "b" of groove bases 28b, 38b, 48b, and 58b decrease generally from the outboard side across the tire pattern to the inboard side. The advantages and purposes of this construction will become more apparent as explained more fully below. Most importantly, it will be noted that the outboard tread groove G1 is generally straight in the circumferential direction around the tire, while the remaining tread grooves have a general sinusoidal or serpentine shape at the groove opening. The sinusoidal shape of the tread groove openings increase in amplitude across the tread pattern from the outboard side to the inboard side, as can best be seen in FIG. 2.

As best can be seen in FIGS. 2 and 4, the rib walls extend generally straight from the rib bases or groove bases radially outward to the rib contact surfaces. The rib walls also taper a specified taper angle "a." As noted above, outboard tread groove G1 has a generally straight groove base and opening extending in the circumferential direction. This geometry is defined by a wall taper angle of about 10° (FIGS. 3B–3C). Tread groove G2 has a wall whose taper angle varies over a range of about 2–14° in the circumferential direction. It will be noted that the varying taper angle also shifts laterally from side-to-side in the circumferential direction. Groove G3 has a wall whose taper angle varies in the circumferential direction in a range of about 2–20.5°, and shifts laterally as well. Tread groove G4 has walls which whose taper angle varies in a range of about 2–28.5°, and also shifts laterally. The generally sinusoidal-shaped grooves G2, G3, and G4 are created by the varying taper angles of the groove-forming rib walls and the lateral shifting of the taper angle from side-to-side, all of which occur in the circumferential direction.

Noting that the rib walls (lateral sides of the grooves) extend substantially straight from the rib base and groove base to the rib contact surface and groove opening, it can be seen that the rib bases are wider than the contact surfaces. In particular, in the inboard tread pattern, this provides good void area for the inboard tread pattern because the road contact surface of the tread ribs becomes significantly smaller in width as compared to the rib bases as the taper angle of the rib walls varies from 2–20.5°. This means that a wide rib base is provided for rib stability while an adequate void area is provided for water removal in the inboard tread pattern.

An important function of the tapered rib walls of the circumferential ribs is to help buttress the tread elements against cornering forces generated by and placed upon the tread ribs. The tapered rib walls of the balanced tread design of this invention vary circumferentially along a plurality of grooves to buttress the tread elements from cornering forces generated in both lateral directions.

As can be seen in FIG. 4, the trapezoidal tread blocks of tread ribs R3, R4, R5 on inboard side 14a have an irregular trapezoidal transverse cross section, as projected on a radial plane. The rib walls of the rib blocks have a circumferential straight edge at the rib base which extend upward to circumferentially curved top edge at the contact surface of the tread rib block. The trapezoidal tread blocks have a substantially constant transverse base width while the transverse width at the contact surfaces varies from a width substantially equal to the transverse base width to a width substantially smaller than the transverse base width. In this manner, the lateral sides of the grooves (which are synonymous with the rib walls) define the taper from each lateral side of the groove base to the groove opening according to the taper angle of the groove; as can best be seen in FIGS. 2, 3A, 3B and 3C.

As can best be seen in FIG. 2, the average width "w" of the groove openings, that is w1, w2, w3, and w4, is generally equal for the groove openings 28b–58b between adjacent contact surfaces (FIG. 3B). The width "b" of the groove bases b1, b2, b3, and b4 decreases across the asymmetrical tread pattern from the outboard to inboard side.

Figure 2A:
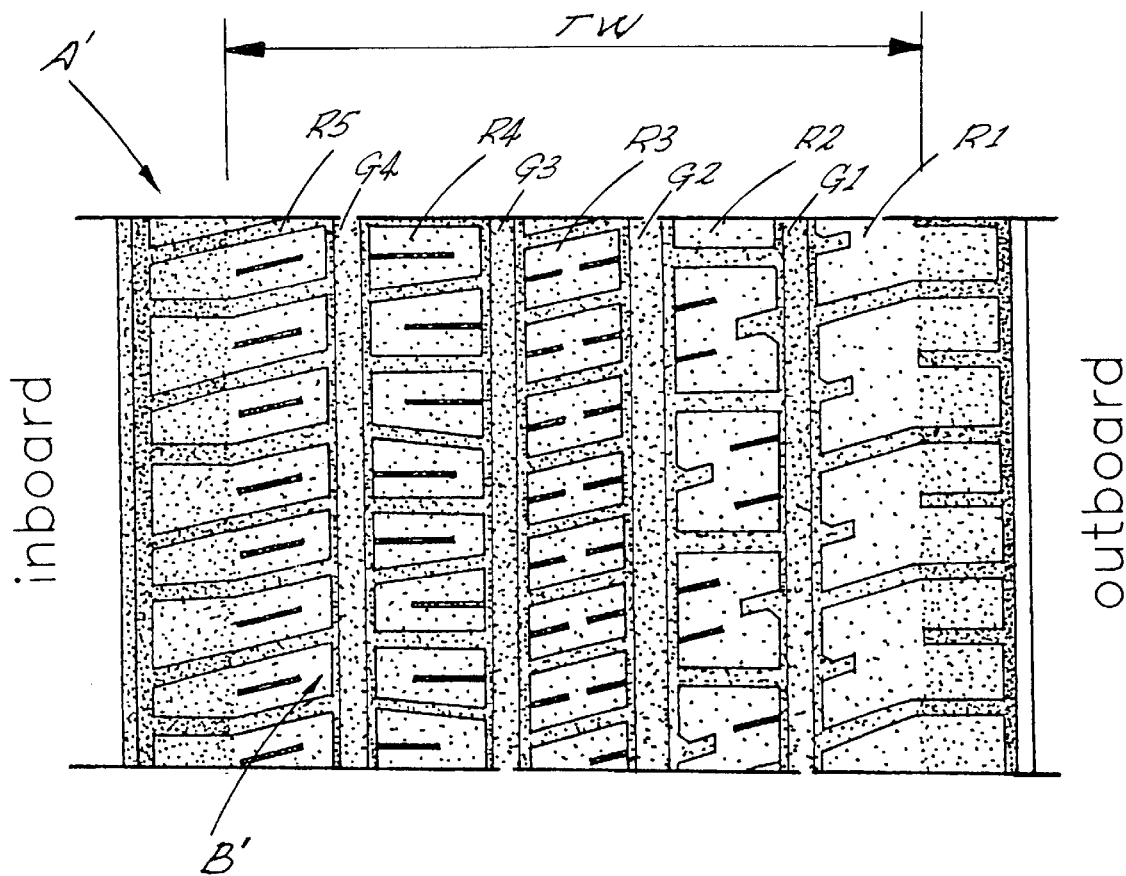
FIG. 2A is a plan view of a prior art asymmetrical tire.

In comparison with the tire of this invention, the conventional asymmetric tire A' of FIG. 2A has a tread pattern B' with grooves G1–G4 having groove openings which vary in transverse width over a tread width TW. In addition, the taper of the lateral sides of each groove is constant along its circumferential length. The tread pattern of this conventional asymmetrical tire further includes ribs R1–R5 with tread blocks which vary in size transversely across the tread width from the inboard side to the outboard side. Unlike the tire of the present invention, the tread blocks of inboard shoulder rib R5 are much smaller than the tread blocks of the outboard shoulder rib R1. These typical groove configurations and block size differences result in a conventional asymmetrical tire having a tread pattern which does not yield as balanced a performance as the tread pattern of the present invention.

Figure 6A:
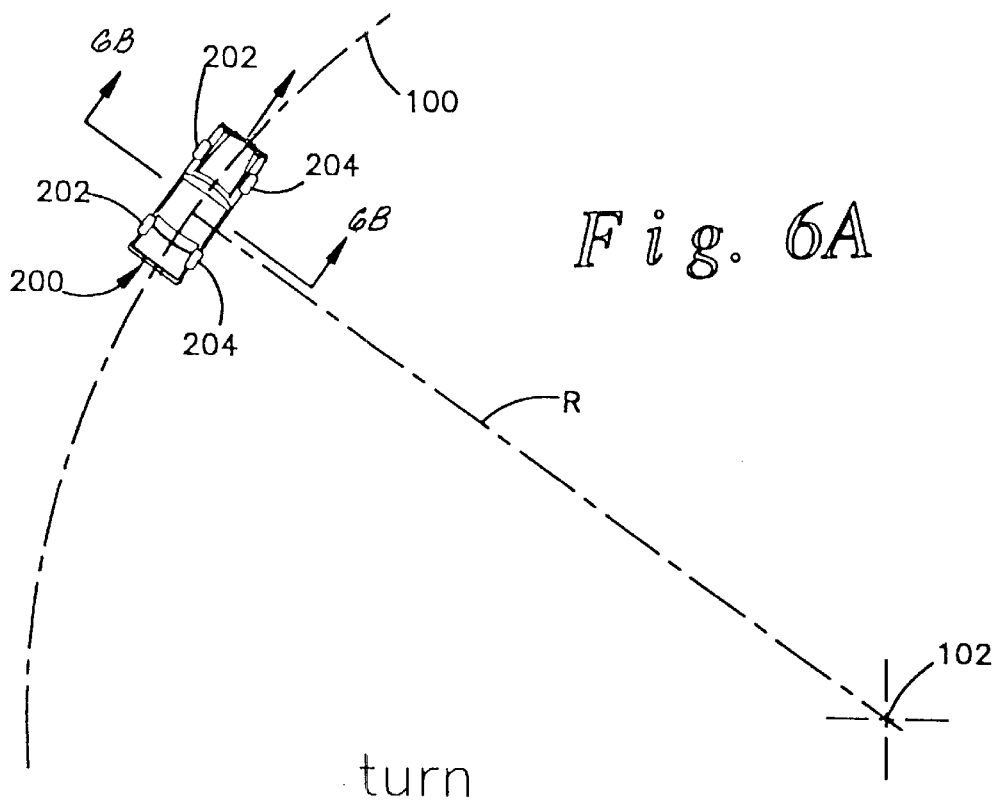
FIG. 6A is a plan view illustrating a turning maneuver of a vehicle.
Figure 6B:
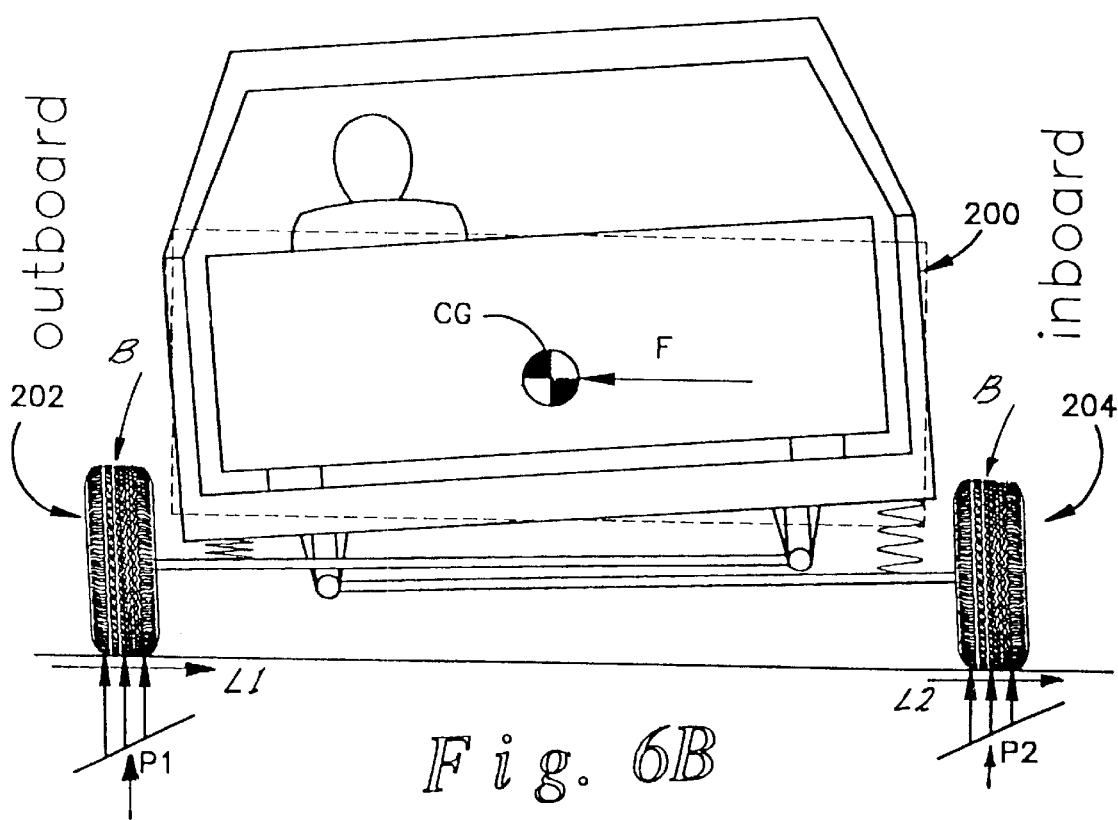
FIG. 6B is a sectional view of a vehicle with a swing axle suspension system during a cornering maneuver.

FIGS. 6A and 6B illustrate the force relationships of handling and cornering for a balanced asymmetric tread design according to the invention. Asymmetrical camber and load transfer between wheels of a vehicle 200 during the vehicular maneuvers, such as cornering, occurs due to vehicle suspension systems. The camber of a wheel, having a tire properly mounted, produces non-uniform forces widthwise across the tread of the tire. For load transfer, the suspension system of FIG. 6B illustrates an unsymmetrical tire loading P1 and P2. Tires 202 on the outside of the vehicle turn path 100, having a turn radius R according to FIG. 6A, have a larger load P1 than the load P2 on tires 204 on the inside of the vehicle turn path 100. Load transfer from lateral accelerations produce a lateral force F at the center of gravity (CG) of the vehicle which causes these unequal loads during cornering maneuvers of the vehicle turning to the left about a turn axis 102. For example tire 202 can have 50 percent more load than tire 204. In addition, the camber causes the outboard half of the asymmetric tread B of tire 202, being a side to the outside of the cornering path 100, to support a load larger than the load on the inboard half of the asymetric tread B of tire 202. The same widthwise distribution of load P2 on the asymmetric tread B of tire 204 also exists, but the larger load is on the inboard half of the asymmetric tread B of tire 204; not the outboard half as for tire 202.

It is well known in the industry that the greater the normal loads the greater the potential ability of the tire to sustain higher lateral loads. However, the tread pattern must be designed to achieve these higher lateral loads. Tires of the art have been designed with a tread pattern that rely heavily on the ability of the outboard side of tire 202 to provide enough lateral load L1 to maneuver the vehicle around the turn. The tire of this invention has a balanced asymmetric tread B which better uses the inside half of tire 204 of FIG. 6B to help produce a higher lateral load L2 than the conventional asymmetrical tire. The lateral load L1 on tire 202 may be reduced somewhat from a conventional asymmetrical tread design (FIG. 2A), but the total lateral load L1+L2 is greater than that of the conventional asymmetrical tread design for better handling of the vehicle.

As noted earlier, efforts to design tires with improved handling and traction in wet, dry and snow conditions have relied on using a different set of tires in the summer than in the winter. The design of a tread pattern which is good for one performance condition generally degrades another performance criteria. As illustrated in FIGS. 5A and 5B, tread pattern designs are typically a compromise between dry, wet and snow performance. Relative performance values are typical industry values for illustrative purpose only. Wet and dry performance can be optimized in a summer tire, as illustrated in the bar graph (FIG. 5A). The relative performance is given a value of 100 to represent the best tread design for dry traction 82 and for wet traction 84. Typically the summer tire snow traction 86 is much less than optimum as the snow performance for snow traction in the summer is much less. Generally speaking, the function of the tread pattern of the summer tire can be highly unbalanced and the tire is best used only as a tire whose directionality matches that of the vehicle's intended forward path. That is, unlike the non-directional tire of this invention, its wet and dry performance degrades when rotated backward.

A representative traction performance of a typical all-season tire is illustrated in the bar graph of FIG. 5B. A wet traction 82a and a dry traction 84a is somewhat less than optimum, but the snow traction 86a has greatly improved to approach the reference value of 100. The tire tread of this invention provides a tread pattern design which has a more balanced dry, wet and snow traction performance, as illustrated in the bar graph of FIG. 5C. Both the dry traction 82b and the wet traction 84b are less than that for a summer tire but better than that of the all-season tire. The snow traction 86b is less than that of the all-season tire but remains at a relatively high value. Therefore, the tread pattern of the tire of this invention has a better balance between snow, wet and dry performance.

Figure 7:
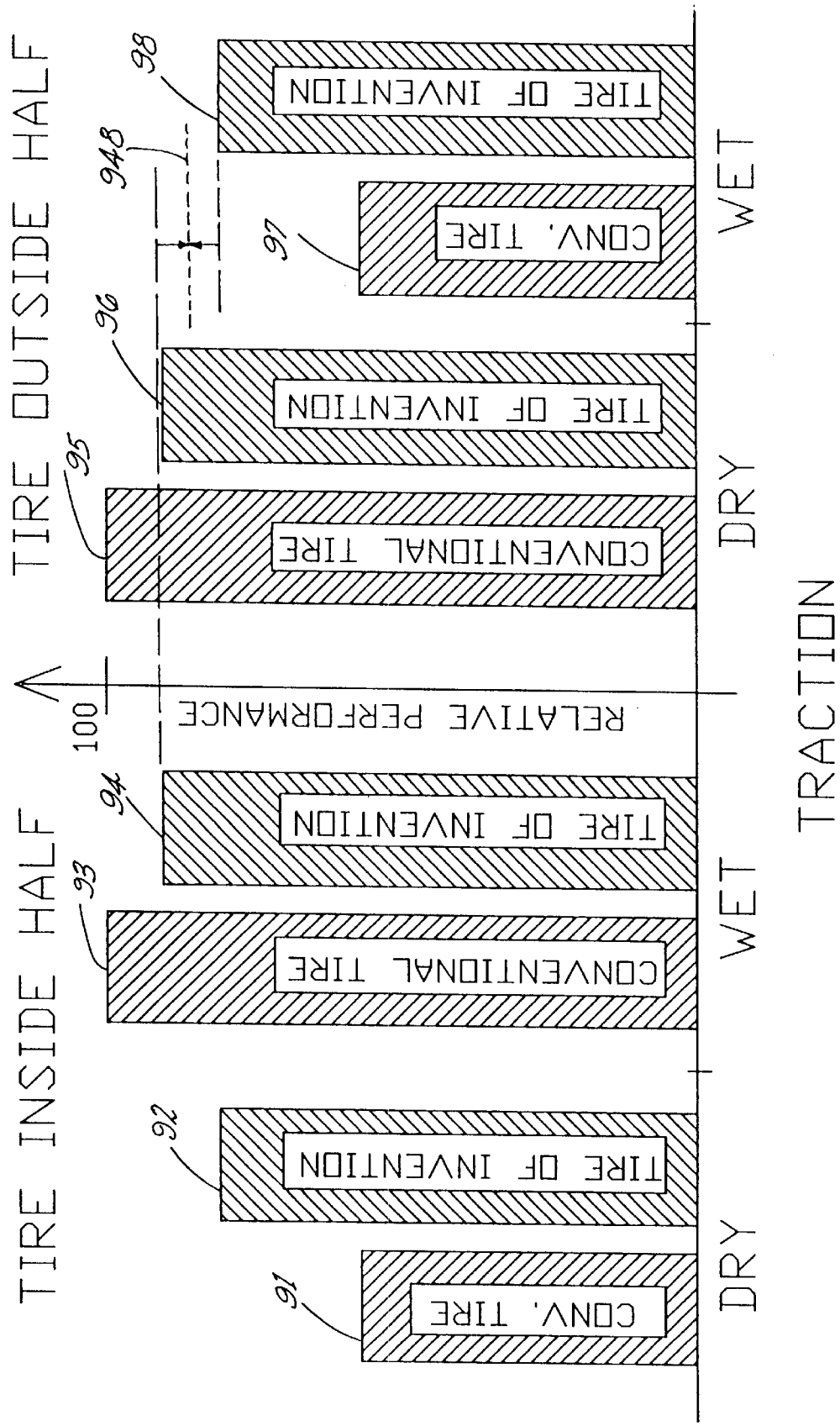
FIG. 7 is a bar graph illustrating the performance of an inside tread pattern and outside tread pattern of a vehicle tire according to the invention as compared to a conventional asymmetric tire.

The balance achieved by asymmetrical tread design B (FIG. 2) is illustrated in the bar graph of FIG. 7. Inboard tread pattern 14 of tire tread B is provides increased dry traction 92 over the dry traction 91 of the conventional asymmetric tire (FIG. 2A). As previously discussed, an increase in one performance parameter is usually accompanied by a decrease in another. This increase in dry traction 92 is at the expense of less wet traction 94 on the inside half over the wet traction 93 of the conventional asymmetric tire. A similar but opposite compromise exists on the outboard or outside half 12 of the tire tread B. The outside half is designed for an increased wet traction 98 over the wet traction 97 of the conventional asymmetric tire. This increase in wet traction is at the expense of less dry traction 96 on the outside half over the dry traction 95 of the conventional symmetric tire. However, the increases in wet and dry traction on one side are better than corresponding decreases on the other side. The result is an overall increase in average performance. For example, line 948 represents the average wet traction between the two sides of the tire. This is a higher value than the average of wet traction 93 and 97 for the two sides of the conventional asymmetric tire tread.

Test Results

Subjective "feel" of the vehicle's performance rated by a professionally trained driver is based on a point system with values from 1 to 10; a 10 point rating being the very best and 5 considered the minimum acceptable level of performance. Test results for different tires are based on the comparative points assigned to each from one test using the same vehicle on the same test track with the same driver on the same day. An improvement in a point rating of 0.5 is considered noticeable by a trained driver. An improvement in a point rating of 1.5 is a breakthrough improvement, noticeable even to an inexperienced driver. The following Table 1 illustrates the improvements in point ratings obtained by comparing a conventional asymmetric tire with the tire of this invention for four standard vehicle performance tests of the industry. The conventional asymmetric tire was a BFGoodrich Comp T/A ZR4 (FIG. 2A) having the same standard size as that of the tire of this invention (FIG. 2). The improvements in the point rating for the tire of the invention are very significant.

TABLE 1

| Performance Test/Tire | Conventional Tire | Tire of the Invention |
| --- | --- | --- |
| Lateral Wet Adherence | Reference | +1.5 |
| Wet Handling | Reference | +2.5 |
| Dry Handling | Reference | +1.0 |
| Maximum Handling | Reference | +1.5 |

A good indicator of center-feel steering response is the measure of aligning moment values at lower slip angles of the tire. Slip angle is the angle between the midcircumferential plane of the tire and the velocity vector of the tire. At a slip angle of 2.5 degrees and a tire load of 5 KiloNewtons, the aligning moment for the tire of this invention (FIG. 2) was 57 percent greater than the aligning moment of the conventional asymmetric tire of FIG. 2A.

Maximum attainable lateral acceleration, or lateral grip, of the tire prior to the tire breaking away and losing grip at higher slip angles, is measured by the lateral force attainable by the tire. At a slip angle of 4 degrees the tire of this invention attained a lateral force 16 percent higher than that of the conventional asymmetric tire of FIG. 2A at the same tire load.

A measure of the longitudinal rigidity of each rib gives a good indication of the tire's ability to stop the vehicle in a short distance; that is to have excellent dry traction. A typical measure of tread rigidity or stiffness is to record the longitudinal force as a function of the displacement on each rib of a loaded tire. The slope of the longitudinal force versus displacement curve is the stiffness value for each rib of the tire's tread. Table 2, shown below, illustrates the values obtained for ribs R1–R5 of the conventional asymmetric tire of FIG. 2A and ribs R1–R5 of the tire of the present invention. The results of Table 2 indicate the stiffness of the ribs of the tire of this invention are much greater than the ribs of the conventional BFGoodrich Comp T/A ZR4 tire of the same size. The lower portion of Table 2 shows the stiffness values relative to the rib with the smallest tread blocks of the conventional asymmetric tire (rib R5). The difference between the rib stiffness values of the ribs of the tire of the present invention (9.38 to 10.47) are much less than the difference between the stiffness values of the conventional asymmetric tire (6.66 to 8.61). This results in a much better balance in stiffness values between the inboard and outboard sides for the tread design of the tire of this invention.

TABLE 2

| RIB NUMBER | R5 | R4 | R3 | R2 | R1 |
| --- | --- | --- | --- | --- | --- |
| Conventional Tire | 6.66 | 8.00 | 8.45 | 8.61 | 7.13 |
| Tire of Invention | 9.82 | 9.38 | 11.05 | 9.95 | 10.47 |
| Conventional Tire | Ref.1.00 | 1.20 | 1.27 | 1.29 | 1.07 |
| Tire of Invention | 1.47 | 1.41 | 1.66 | 1.49 | 1.57 |

Thus, it can be seen that an advantageous construction can be had for an all-season asymmetrical vehicle tire according to the invention wherein the asymmetric inboard and outboard tread patterns provide a generally balanced wet, dry, and snow performance. Advantageously, the inboard tread blocks are stabilized for increase dry performance without sacrificing wet performance by utilizing widened tread rib bases with adequate circumferential and lateral groove openings; and the outboard tread pattern is provided with increase water removal design features without sacrificing the stability and stiffness of the tread ribs necessary for dry performance.

While a preferred embodiment of the invention has been described using specific terms, such description is for illustrative purposes only, and it is to be understood that changes and variations may be made without departing from the spirit or scope of the following claims.

What is claimed is:

1. A vehicle tire having balanced wet and dry performance comprising:
    a tire carcass having an inboard side facing inwardly of said vehicle and an outboard side facing outwardly of said vehicle;
    an asymmetrical tread pattern including an inboard tread pattern and an outboard tread pattern;
    said inboard tread pattern including a plurality of inboard tread ribs and tread grooves extending circumferentially around said tire carcass;
    said outboard tread pattern including a plurality of outboard tread ribs and tread grooves extending circumferentially around said tire carcass;
    said tread ribs being defined by rib contact surfaces, bottom rib bases, and rib walls extending between said rib bases and said contact surfaces;
    said tread grooves being formed by said rib walls of adjacent tread ribs extending upwardly from groove bases, and top groove openings between adjacent tread ribs at said rib contact surfaces;
    top edges of said groove openings being curved from side-to-side in the circumferential direction, and said groove openings having an average width which is substantially equal across said tread pattern; and
    said groove bases having generally straight edges extending in the circumferential direction.

2. The tire of claim 1 wherein said groove bases decrease in width from said outboard side to said inboard side of said asymmetrical tread pattern.

3. The tire of claim 1 wherein said inboard tread ribs have rib bases which are wider than said road contact surfaces of said tread ribs so that said inboard tread ribs have increased stability for dry handling performance while maintaining void area for water removal and wet handling performance.

4. The tire of claim 3 wherein said outboard tread grooves are generally straighter and have wider groove bases than said inboard tread grooves so that increased water removal is provided for wet handling performance while maintaining dry handling performance.

5. The tire of claim 1 including a plurality of sinusoidal grooves included in said inboard tread portion which become increasingly sinusoidal in amplitude toward said inboard side; and
    said sinusoidal grooves being defined by said rib walls tapered at an angle to said mid-circumferential plane creating rib bases which are wider than road contact surfaces to provide increased tread stability and enhanced dry performance on said inboard side.

6. The tire of claim 1 wherein said contact surfaces of said inboard and outboard tread patterns are generally equal in area.

7. The tire of claim 6 wherein said inboard and outboard void areas are equal within a range of about ±2%.

8. The tire of claim 1 wherein said asymmetrical tread pattern, with balanced groove openings and rib contact surface areas, provides a non-directional tire having balanced wet and dry performance when mounted on either side of said vehicle to rotate in one direction or the opposite direction during forward motion of said vehicle.

9. A high performance asymmetrical vehicle tire having increased wet and dry handling and traction comprising:
    an asymmetrical tire tread pattern having an inboard side and outboard side with an inboard tread pattern and an outboard tread pattern defined with respect to a mid-circumferential plane of a carcass of the vehicle tire;
    said inboard tread pattern including a plurality of circumferential inboard tread ribs with circumferential inboard tread grooves defined between said inboard tread ribs;
    said outboard tread pattern including a plurality of circumferential outboard tread ribs with circumferential outboard tread grooves defined between said outboard tread ribs;
    said inboard tread ribs and said outboard tread ribs having a rib contact surface, defined as a radially outer surface of said ribs that contacts a road surface, and a rib base;
    an inboard contact surface area defined by the contact area of said inboard ribs and an outboard contact surface area defined by the contact surface of said outboard tread ribs wherein said inboard and outboard contact surface areas are substantially equal;
    a plurality of tread grooves formed in said inboard and outboard tread patterns, and said inboard tread pattern having a higher density of lateral grooves than said outboard tread pattern, wherein said inboard and outboard tread grooves including a groove opening having a width defined between adjacent rib contact surfaces wherein said groove width is generally equal for said tread grooves, and wherein said inboard and outboard grooves include a groove base extending generally straight in the circumferential direction, and said groove opening of said inboard tread grooves is generally serpentine in shape; and said inboard and outboard tread ribs having an average rib width at said contact surface which is generally equal.

10. The tire of claim 1 wherein the width of said groove base for said tread grooves increases from said inboard to said outboard side to enhance wet performance on said outboard side.

11. The tire of claim 1 wherein at least said inboard tread grooves have a general sinusoidal shape at said groove opening wherein said tread grooves become progressively more sinusoidal in amplitude across said inboard tread portion.

12. The tire of claim 11 wherein said tread grooves include a circumferentially generally straight groove base defined between rib bases of adjacent tread ribs, a groove opening defined between rib contact surfaces of adjacent tread ribs, and said groove base of said tread grooves decreasing in base width from said outboard side to said inboard side.

13. The tire of claim 12, wherein said asymmetrical tread pattern includes a first outboard groove having a generally straight groove base and a generally straight groove opening.

14. The tire of claim 11 wherein said sinusoidal tread grooves are defined by rib walls of adjacent tread ribs which taper outwardly and upwardly from said groove bases to said rib contact surfaces so that said rib bases have an area greater than said rib contact surfaces to enhance dry handling performance of said inboard tread portion.

15. The tire of claim 14 wherein said taper of said rib walls increases from said outboard side toward said inboard side of said tire.

16. The tire of claim 15 including a first outboard groove having a wall taper of about 10 degrees, a second outboard groove having a wall taper which varies over a range of about 2 to 14 degrees, a first inboard groove having a wall taper which varies over a range of about 2 to 20.5 degrees, and a second inboard groove having a wall taper which varies over a range of about 2 to 28.5 degrees.

17. The tire of claim 15 wherein said sinusoidal tread grooves have a wall taper angle which varies and shifts laterally from side-to-side in the circumferential direction of said tread grooves.

18. The tire of claim 1 wherein said inboard and outboard contact surface areas are equal within a range of about ±2%.

19. The tire of claim 9 wherein said rib base of said inboard tread ribs has a base area which is greater than said contact surface area of said tread ribs providing increased strength and stability for said inboard tread ribs to enhance dry handling performance of said inboard tread pattern.

20. The tire of claim 1 wherein groove-forming rib walls of adjacent tread ribs defining said inboard tread grooves are provided such that:

said rib walls have a taper which makes a taper angle with a plane parallel to said mid-circumferential plane;

said rib walls of said inboard tread grooves have a taper angle which varies and shifts laterally along the circumference of said tread grooves; and said rib wall taper provides a rib base area which is larger than said rib contact surface area for increased inboard tread stability and strength.

21. The tire of claim 20 wherein said taper angle of an inboard tread groove varies over a range of about 2 to 28.5 degrees over the circumference of the tire; said taper of an adjacent inboard tread groove varies over a range of about 2 to 20.5 degrees over the circumference of the tire; and said taper of an adjacent outboard tread groove varies in a range of about 2 to 14 degrees over the circumference of the tire.

22. The tire of claim 20 wherein said outboard tread grooves are straighter than said inboard grooves to provide increased water removal from said outboard tread pattern enhancing wet performance for said outboard tread pattern.

23. The tire of claim 22 wherein said tread grooves have a base width which is progressively wider from said inboard side to said outboard side.

24. The tire of claim 1 wherein said inboard tread pattern, said outboard tread pattern and said groove openings provide a non-directional tire having balanced wet and dry performance when mounted on either side of said vehicle to rotate in one direction on one side of said vehicle and the opposite direction on the other side of said vehicle during forward motion of said vehicle.

* * * * *